United States Patent [19]

Rosenbrand et al.

[11] Patent Number: 5,116,797
[45] Date of Patent: May 26, 1992

[54] POLYMERIZATION PROCESS

[75] Inventors: Gerrit G. Rosenbrand, Amsterdam, Netherlands; Pui K. Wong, Katy, Tex.

[73] Assignee: Shell Oil Company, Houston, Tex.

[21] Appl. No.: 651,706

[22] Filed: Feb. 6, 1991

Related U.S. Application Data

[62] Division of Ser. No. 424,650, Oct. 20, 1989, Pat. No. 5,010,170.

Foreign Application Priority Data

[30] Oct. 24, 1988 [NL] Netherlands .................. 8802611

[51] Int. Cl.⁵ .............................................. B01J 31/24
[52] U.S. Cl. ................................. 502/162; 502/168
[58] Field of Search .................................. 502/162

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,903 | 9/1989 | Van Broekhoven et al. | 528/392 |
| 4,914,184 | 4/1990 | Rosenbrand et al. | 528/392 |
| 4,940,776 | 7/1990 | Bakkum et al. | 528/392 |

FOREIGN PATENT DOCUMENTS

| | | |
|---|---|---|
| 121965 | 3/1984 | European Pat. Off. |
| 181014 | 5/1986 | European Pat. Off. |
| 213671 | 3/1987 | European Pat. Off. |
| 257663 | 8/1988 | European Pat. Off. |
| 1081304 | 8/1967 | United Kingdom |

Primary Examiner—Patrick P. Garvin

[57] ABSTRACT

An improved process for the production of linear alternating polymer of carbon monoxide and at least one ethylenically unsaturated hydrocarbon comprises the contacting of the monomeric reactants under polymerization conditions in the presence of a reaction diluent and a catalyst composition formed from a palladium compound, the anion of a non-hydrohalogenic strong acid and a mixture of tetraaryl diphosphine ligands; one of which diphosphines has an ortho alkoxy substituent on each aryl moiety and one of which is free from alkoxy substitution in ortho positions. The process is characterized by a relatively high degree of catalyst activity and a low degree of reactor fouling.

10 Claims, No Drawings

POLYMERIZATION PROCESS

This is a division of application Ser. No. 07/424,650 filed Oct. 20, 1989 and now U.S. Pat. No. 5,010,170.

FIELD OF THE INVENTION

This invention relates to an improved process for the production of linear alternating polymers of carbon monoxide and at least one ethylenically unsaturated hydrocarbon, and to the catalyst compositions employed in the polymerization. More particularly, the invention relates to the process of producing such linear alternating polymers in the presence of a catalyst composition formed from, inter alia, certain mixtures of tetraaryl diphosphine ligands.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of a free radical initiator, e.g., peroxy compounds. G.B. 1,081,304 produced similar polymers of higher carbon monoxide content in the presence of alkylphosphine complexes of palladium compounds as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, now becoming known as polyketones or polyketone polymers, has become of greater interest in part because of the greater availability of the polymers. The more recent processes for the production of such polymers are illustrated by a number of published European Patent Applications including 121,965, 181,014, 213,671 and 257,663. The processes typically involve a catalyst composition formed from a compound of a Group VIII metal selected from palladium, cobalt or nickel, the anion of a non-hydrohalogenic strong acid and a bidentate ligand of phosphorus, arsenic or antimony. The resulting polymers are relatively high molecular weight materials having established utility as premium thermoplastics in the production of shaped articles such as containers for food and drink produced by well known methods for processing thermoplastic polymers.

In preferred modifications, the catalyst composition employed in the production of the polyketone polymers is formed from a palladium compound, the anion of a non-hydrohalogenic acid having a pKa below about 4, preferably below 2, and a bidentate ligand of phosphorus. The bidentate phosphorus ligands found to be useful are tetraaryldiphosphines of the general type illustrated by 1,3-bis(diphenylphosphino)propane. The particular nature of the phosphorus ligand has considerable importance in the rate at which polymer is produced as well as the molecular weight and other characteristics of the polymer product. The use of a bidentate phosphorus ligand in which each aryl group has an alkoxy substituent on a ring carbon atom ortho to the atom through which the group is attached to phosphorus leads to a high activity catalyst which provides good polyketone product. The advantages of using a catalyst composition based on this ligand must be balanced against an increased degree of reactor fouling obtained when such a catalyst composition is employed. Use of ligands wherein the aryl groups are not alkoxy-substituted gives lower reactor fouling, but also provides a lower catalyst activity.

Methods are available to reduce the reactor fouling. Control of catalyst composition addition is shown to reduce reactor fouling in U.S. Pat. No. 4,914,184. Introduction of particulate matter into the polymerization reactor to reduce fouling is the subject of U.S. Pat. No. 4,940,776. It would be of advantage, however, to provide a catalyst composition which provides a high level of activity but avoids substantial reactor fouling.

SUMMARY OF THE INVENTION

The present invention provides an improved process for the production of linear alternating polymer of carbon monoxide and at least one ethylenically unsaturated hydrocarbon. More particularly, the invention provides a process for the production of such linear alternating polymer in the presence of a catalyst composition formed from, inter alia, a mixture of tetraaryl diphosphine ligands wherein the aryl substituents of at least one ligand have alkoxy groups substituted on ring carbon atoms ortho to the carbon atom which connects the azyl group to phosphorus, and one ligand wherein the aryl groups do not contain ortho alkoxy substituents.

DESCRIPTION OF THE INVENTION

The polyketone polymers which are produced by the improved process of the invention are linear alternating polymers of carbon monoxide and at least one ethylenically unsaturated hydrocarbon and contain substantially one molecule of carbon monoxide for each molecule of unsaturated hydrocarbon. Suitable ethylenically unsaturated hydrocarbons for use in the process of the invention have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic having an aryl substituent on a carbon atom of an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the polymer product of the improved process of the invention is a terpolymer of carbon monoxide, ethylene and a second unsaturated hydrocarbon of at least 3 carbon atoms, there will be within the terpolymer at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

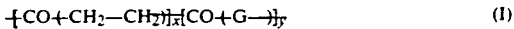  (I)

wherein G is the moiety of the second ethylenically unsaturated hydrocarbon polymerized through the ethylenic unsaturation thereof and the ratio of y:x is no more than about 0.5. In the case of terpolymers, the —CO—(CH₂CH₂)— units and the —CO—(G)— units are found randomly throughout the polymer chain and preferred ratios of y:x are form about 0.01 to about 0.1. When copolymers of carbon monoxide and ethylene are produced by the process of the invention there will be no second hydrocarbon present and the copolymers are represented by the above formula wherein y is zero. The end groups or "caps" of the polymer chain will depend upon what materials are present during the production of the polymers and whether or how the polymer was purified. The precise properties of the polymers are not apparently influenced by the end groups to any considerable extent so that the polymers are fairly represented by the polymer chain as above depicted.

Of particular interest are the linear alternating polymers of number average molecular weight from about 1000 to about 200,000, particularly those polymers of number average molecular weight from about 20,000 to about 90,000, as determined by gel permeation chromatography. The properties of the polyketone polymers will be determined in part by the molecular weight, whether the polymer is a copolymer or a terpolymer and, in the case of terpolymers the nature of and the proportion of the second hydrocarbon present. Typical melting points for the polyketone polymers are from about 170° C. to about 300° C. but more often are from about 210° C. to about 270° C. The polymers will have a limiting viscosity number (LVN), measured in a standard capillary viscosity measuring device in m-cresol at 60° C., of from about 0.5 dl/g to about 10 dl/g and more preferably from about 0.8 dl/g to about 4 dl/g.

The general method for the production of the polyketone polymers is illustrated by the above published European Patent Applications wherein the 121,965 application shows a mixture of phosphines. The carbon monoxide and hydrocarbon monomers are contacted under polymerization conditions in the presence of the catalyst composition formed from the palladium compound, the strong non-hydrohalogenic acid and bidentate phosphorus ligand. The palladium compound is preferably a palladium carboxylate and compounds such as palladium acetate, palladium propionate and palladium octanoate are satisfactory. The use of palladium acetate in the formation of the catalyst composition is particularly preferred. The anion is the anion of a non-hydrohalogenic acid having a pKa (measured in water at 18° C.) of below about 4 and preferably below 2. Suitable anions include anions of inorganic acids such as sulfuric acid and perchloric acid and anions of organic acids including carboxylic acids such as trifluoroacetic acid, trichloroacetic acid and difluoroacetic acid as well as sulfonic acids such as methanesulfonic acid, p-toluenesulfonic acid and trifluoromethanesulfonic acid. Trifluoroacetic acid and p-toluenesulfonic acid constitute a preferred class of acid precursors of the anion employed in the formation of the catalyst compositions of the invention. The anion is preferably provided as the free acid but optionally may be provided as a metal salt, particularly as a non-noble transition metal salt. In yet another embodiment, the anion and the palladium are provided as a single compound, e.g., palladium trifluoroacetate. The anion is provided in a quantity of from about 0.5 mole to about 50 moles per mole of palladium but is preferably provided in an amount from about 1 mole to about 25 moles per mole of palladium.

The phosphorus ligand mixture used as precursor of the catalyst compositions employed in the process of the invention is a mixture of tetraaryl diphosphines of the formula

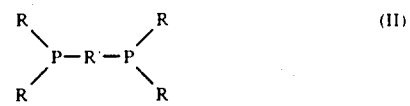

wherein R independently is aromatic of up to 10 carbon atoms inclusive and is hydrocarbyl containing only atoms of carbon and hydrogen or is substituted hydrocarbyl containing additional atoms in the form of monovalent ring substituents such as halogen, particularly fluoro or chloro, or alkoxy. Suitable R groups include phenyl, naphthyl, 4-tolyl, 2-chlorophenyl, 2-methoxyphenyl, 2,6-diethoxyphenyl, 4-propoxyphenyl, 2,4,5-trimethoxyphenyl, 2,4,6-trimethoxyphenyl, 2,4-difluorophenyl, 3,5-dichlorophenyl and 4-chloro-2-methylphenyl. The R' group is a divalent linking group, preferably hydrocarbon, of up to 10 carbon atoms inclusive having from 2 to 4 carbon atoms inclusive in the bridge. Illustrative R' groups are 1,2-ethylene (dimethylene), 1,3-propylene (trimethylene), 1,3-(2,2-dimethyl)-propylene and 1,3-(2-methyl-2-diphenylphosphinomethyl)-propylene. The preferred R' groups are of the formula $+CH_2)_n$ wherein n is an integer from 2 to 4 inclusive and particularly preferred is 1,3-methylene.

In the phosphine ligand mixture employed as catalyst composition precursor the major component is a tetraaryl diphosphine of the above formula II wherein each aryl group, i.e., each R group, has an alkoxy substituent at least on one carbon atom which is ortho to the carbon atom through which the R group is connected to phosphorus. Illustrative of such ligands are 1,3-bis[di(2-methoxyphenyl)phosphino]propane, 1,2-bis[bis(2,4-diethoxyphenyl)phosphino]ethane, 1,4-bis[di(2-ethoxy-4-chlorophenyl)phosphino]butane and 1,3-bis[bis(2,4,6-trimethoxyphenyl)phosphino]propane. This ortho-alkoxyaryl-containing ligand is present in at least 50% of the mixed ligand and preferably is present in an amount of at least 65% of the total mixed ligand. The remaining portion of the mixed ligand system is tetraaryl diphosphine of the above formula II wherein each R group is free of alkoxy substitution in ortho positions. Illustrative of these ligands are 1,3-bis[di(4-chlorophenyl)phosphino]propane, 1,4-bis[di(4-methoxyphenyl)phosphino]butane and 1,3-bis[di(2-methylphenyl)phosphino]propane. The preferred phosphine ligand systems comprise 1,3-bis[di(2-methoxyphenyl)phosphino]propane employed in conjunction with 1,3-bis(diphenylphosphino)propane or 1,3-bis[di(4-chlorophenyl)phosphino]propane. The mixed phosphine ligand is provided in an amount of from about 0.5 mole to about 2 moles per mole of palladium, preferably from about 0.75 mole to about 1.5 mole per mole of palladium.

It is, on occasion, useful to include within the catalyst composition solution an organic oxidant in order to enhance the activity of the catalyst. The use of quinones for this purpose is satisfactory including the use of benzoquinones and naphthoquinones. Particularly preferred is 1,4-benzoquinone. The presence of organic oxidant is optional and not required but amounts up to about 5000 moles per mole of palladium are satisfactory.

The process of the invention comprises the contacting of the monomeric reactants under polymerization conditions in the presence of the catalyst composition and a reaction diluent. Sufficient catalyst composition is employed to provide from about $1\times10^{-7}$ mole to about $1\times10^{-3}$ mole of palladium per mole of ethylenically unsaturated hydrocarbon to be polymerized, preferably from about $1\times10^{-6}$ mole to about $1\times10^{-4}$ mole of palladium per mole of unsaturated hydrocarbon. The molar ratio of total ethylenically unsaturated hydrocarbon to carbon monoxide is from about 10:1 to about 1:5 but more frequently the molar ratio will be from about 5:1 to about 1:2. Typical polymerization conditions include a reaction temperature from about 40° C. to about 120° C., preferably from about 50° C. to about 100° C. Polymerization pressures from about 20 bar to about 150 bar, particularly from about 30 bar to about 100 bar, are preferred.

The contacting of the reactants and catalyst composition is conducted by conventional methods such as shaking or stirring. Subsequent to the resulting polymerization, the polymer produce which is substantially insoluble in the product medium is recovered by well known techniques such as filtration or decantation. The polymer product is used as such or is purified as by contact with a solvent or complexing agent which is selective for catalyst residues.

The process of the invention is conducted, in the most simple embodiment, by contacting the reactants and ultimately recovering the product as above described. The process produces linear alternating polymer at a high rate with relatively high molecular weight product being obtained and with a low degree of reactor fouling being observed. However, variations or modifications of the process are also possible. In one alternate embodiment, the polymerization is initially conducted in the presence of a catalyst composition formed from, inter alia, the diphosphine ligand wherein the aryl groups are free from ortho alkoxy substitution. During the course of the polymerization the ortho-alkoxy-containing ligand is added, preferably along with other catalyst composition components. In yet another embodiment, the process of the present invention is combined with that of U.S. Pat. No. 4,940,776, by including within the reaction mixture particulate matter such as a preformed linear alternating polymer. When particulate solid is added, the amount of solid matter added should be in accord with the mathematical relationship $$a \geq 100 \times b \times c$$

wherein a represents the number of grams of solid matter to be added per liter of reaction diluent present, b represents the average particle size of the solid matter being added in meters$^2$ and c represents the bulk density of the solid matter in kg/m$^3$.

The polymer products of the process of the invention are thermoplastics and are processed by methods conventional for thermoplastics, e.g., injection molding, extrusion and thermoforming, into films, fibers, sheets and shaped parts of established utility.

The invention is further illustration by the following Comparative Examples (not of the invention) and the Illustrative Embodiments which should not be regarded as limiting the invention. In the following descriptions, all carbon monoxide/ethylene copolymers were shown by $^{13}$C-NMR to be linear alternating polymers of the repeating unit $-CO+C_2H_4+$ and $-CO+C_3H_6+$ units.

COMPARATIVE EXAMPLE I

A carbon monoxide/ethylene/propylene terpolymer was produced by charging 45 kg of methanol and 3.5 kg of propylene to an autoclave of 100 liter capacity equipped with a mechanical stirrer. The contents of the autoclave were heated to 80° C. and ethylene was added until a pressure of 19.8 bar was reached, followed by addition of carbon monoxide until a pressure of 45 bar was reached. A catalyst composition solution was then added which comprised 300 ml acetone, 0.375 mmol palladium acetate, 7.5 mmol trifluoroacetic acid and 0.394 mmol 1,3-bis[di(2-methoxyphenyl)phosphino]propane.

During the resulting polymerization the pressure was maintained at 45 bar by the addition of an equimolar mixture of carbon monoxide and ethylene. After 48 hours the reaction was terminated by cooling the mixture to room temperature and releasing the pressure. The polymer suspension was removed through an opening in the bottom of the autoclave and the autoclave was washed with 45 liters of methanol to remove any particulate polymer remaining in the autoclave. The combined methanol suspensions were filtered and the recovered terpolymer was washed with methanol and dried at 50° C. The yield to terpolymer was 7.5 kg and the terpolymer had a melting point of 227° C. and an LVN, measured in m-cresol at 60° C., also termed LVN(60), of 1.82 dl/g. The rate of polymer production was 4.0 kg terpolymer/g Pd hr.

Inspection of the reactor indicated that a portion of the terpolymer product had deposited on the reactor walls. This terpolymer was removed mechanically, washed with methanol and dried at 50° C. The quantity of this terpolymer was 220 g representing a reactor fouling of 2.8% of the total terpolymer product.

ILLUSTRATIVE EMBODIMENT I

A terpolymer of carbon monoxide, ethylene and propylene was produced by a procedure substantially similar to that of Comparative Example I except that the 0.394 mmol of the phosphine ligand was replaced by 0.295 mmol of 1,3-bis[di(2-methoxyphenyl)phosphino]propane and 0.099 mmol of 2-methyl-2-(diphenylphosphinomethyl)-1,3-bis(diphenylphosphino)propane. The yield of polymer was 7.2 kg and the polymer had an LVN(60) of 1.63 dl/g and a melting point of 225° C., and was produced at a rate of 3.8 kg of terpolymer/g Pd hr.

The terpolymer remaining in the reactor was 85 g and thus the reactor fouling was 1.2%.

COMPARATIVE EXAMPLE II

A carbon monoxide/ethylene/propylene terpolymer was produced by a procedure substantially similar to that of Comparative Example I, except that
a) 1000 g of a linear alternating terpolymer of carbon monoxide, ethylene and propylene was suspended in the reaction mixture,
b) the catalyst composition solution contained 150 ml of methanol and 150 ml of toluene instead of 300 ml methanol and 0.45 mmol instead of 0.394 mmol of the phosphine ligand, and
c) the reaction time was 165 hours instead of 48 hours. The suspended terpolymer had an LVN (60), of 1.45 dl/g, an average particle size of $2\times10^{-4}$m, a bulk density of 270 kg/m³ and a melting point of 234° C. The polymer product yield was 16.0 kg and the polymer had an LVN(60) of 1.69 dl/g and a melting point of 233° C. and was produced at a rate of 2.3 kg of terpolymer/g Pd hr.

The polymer mechanically recovered from the autoclave was 160 g representing a reactor fouling of 1.1%.

ILLUSTRATIVE EMBODIMENT II

A carbon monoxide/ethylene/propylene terpolymer was produced by a procedure substantially similar to that of Comparative Example II, except that a) the phosphine component of the catalyst composition was 0.34 mmol 1,3-bis[di(2-methoxyphenyl)phosphino]propane and 0.11 mmol 2-methyl-2-(diphenylphosphinomethyl)-1,3-bis(diphenylphosphino)propane, and
b) the reaction time was 113 hours instead of 165 hours.

The terpolymer yield was 12.7 kg of terpolymer having an LVN(60) of 1.60 dl/g and a melting point of 228° C., and the terpolymer was produced at a rate of 2.8 kg of terpolymer/g Pd hr.

The polymer mechanically recovered from the autoclave was 67 g representing a reactor fouling of 0.6%.

ILLUSTRATIVE EMBODIMENT III

A terpolymer of carbon monoxide, ethylene and propylene was produced by a procedure substantially like that of Illustrative Embodiment II except that a) the catalyst composition solution contained 0.75 mmol of trifluoroacetic acid instead of 7.5 mmol, and
b) the reaction time was 144 hours instead of 113 hours.

The polymer yield was 17.5 kg of terpolymer having a LVN(60) of 1.68 dl/g and a melting point of 242° C., and the polymerization rate was 3.0 kg of terpolymer/g Pd hr. In this case, reactor fouling was less than 0.1%.

COMPARATIVE EXAMPLE III

A carbon monoxide/ethylene/propylene terpolymer was produced by a procedure substantially similar to that of Comparative Example I except that the phosphine of the catalyst composition was 2-methyl-2-(diphenylphosphinomethyl)-1,3-bis(diphenylphosphino)propane. The polymer product yield was 2.4 kg of terpolymer having a LVN(60) of 0.4 dl/g and a melting point of 210° C., produced at a rate of 1.2 kg of terpolymer/g Pd hr.

In this example the reactor fouling was less than 0.1%.

COMPARATIVE EXAMPLE IV

A copolymer of carbon monoxide and ethylene was produced by charging 180 ml of methanol to an autoclave of 300 ml capacity equipped with a mechanical stirrer. After the contents of the autoclave had been heated to 90° C., an equimolar mixture of carbon monoxide and ethylene was added until a pressure of 55 bar was reached. A catalyst composition solution was then added which comprised 24.5 mol methanol, 1.5 ml toluene, 0.01 mmol palladium acetate, 0.20 mmol trifluoroacetic acid and 0.012 mmol 1,3-bis[di(2-methoxyphenyl)phosphino]propane.

The pressure in the autoclave was maintained by addition of an equimolar mixture of carbon monoxide and ethylene. After 2.58 hours the reaction was terminated by cooling the reactor and contents to room temperature and releasing the pressure. The yield of copolymer was 2.00 g and the copolymer had an LVN of 1.68 dl/g and was produced at a rate of 2.3 kg of copolymer/g Pd hr.

The amount of copolymer mechanically removed from the reactor was 4.22 g which represented a reactor fouling of 68%.

COMPARATIVE EXAMPLE V

A carbon monoxide/ethylene copolymer was produced by a procedure substantially similar to that of Comparative Example IV except that the phosphine of the catalyst composition solution was 0.010 mmol of 1,3-bis(diphenylphosphino)propane, and the reaction time was 2 hours instead of 2.58 hours. The yield of copolymer was 21.02 g, LVN(60) of 0.44 dl/g, produced at a rate of 10.1 kg of copolymer/g Pd hr.

The copolymer mechanically recovered from the reactor was 0.43 g which represented a reactor fouling of 2%.

ILLUSTRATIVE EMBODIMENT IV

A carbon monoxide/ethylene terpolymer was produced by the procedure of Comparative Example IV except that a) the phosphine provided to the catalyst composition solution was 0.0026 mmol 1,3-bis(diphenylphosphino)propane and 0.0079 mmol 1,3-bis[di(2-methoxyphenyl)phosphino]propane, and
b) the reaction time was 2 hours instead of 2.58 hours.

The yield of copolymer was 17.27 g, produced at a rate of 9 kg of copolymer/g Pd hr. The copolymer had an LVN(60) of 1.5 dl/g. The copolymer mechanically recovered from the autoclave was 1.89 g which represented a reactor fouling of 9.9%.

ILLUSTRATIVE EMBODIMENT V

A copolymer of carbon monoxide and ethylene was produced by charging 190 ml of methanol to a 300 ml autoclave equipped with a mechanical stirrer. After the autoclave and contents had been heated to 90° C., an equimolar mixture of carbon monoxide and ethylene was introduced until a pressure of 55 bar was reached. A catalyst composition solution was then introduced which comprised 20 ml methanol, 0.15 ml toluene, 0.001 mmol palladium acetate, 0.02 mmol trifluoroacetic acid, and 0.001 mmol 1,3-bis(diphenylphosphino)propane. The pressure in the autoclave was maintained by adding an equimolar mixture of carbon monoxide and ethylene. After 1.15 hours a second catalyst composition solution was added which comprised 24 ml methanol, 1.35 ml toluene, 0.009 mmol palladium acetate, 0.18 mmol trifluoroacetic acid and 0.009 mmol 1,3-bis[di(2-methoxyphenyl)phosphino]propane. After an additional 2.23 hours the polymerization was terminated by cooling the reactor and contents to room temperature and releasing the pressure.

The yield of copolymer product was 11.77 g, produced at a rate of 9.3 kg of copolymer/g Pd hr. The product had an LVN(60) of 1.32 dl/g. The copolymer mechanically removed from the autoclave was 0.68 g which represented a reactor fouling of 5.5%.

ILLUSTRATIVE EMBODIMENT VI

A copolymer of carbon monoxide and ethylene was produced by a procedure substantially similar to that of Comparative Example IV except that 160 ml of methanol was initially introduced into the autoclave instead of 180 ml, the catalyst composition solution comprised 22.25 ml methanol, 0.75 ml toluene, 0.005 mmol palladium acetate, 0.1 mmol trifluoroacetate, 0.0013 mmol 1,3-bis[di(4-chlorophenyl)phosphino]propane and 0.0045 mmol 1,3-bis[di(2-methoxyphenyl)phosphino]-propane, and the reaction time was 4.05 hours instead of 2.58 hours.

The yield of copolymer product was 19.65 g produced at a rate of 10.4 kg of copolymer/g Pd hr. The copolymer had an LVN(60) of 1.89 dl/g. The copolymer mechanically removed from the autoclave was 2.70 g which represented a reactor fouling of 12.1%.

What is claimed is:

1. A catalyst composition formed from a compound of palladium, an anion of a non-hydrohalogenic acid having a pKa below about 4 and a mixture of tetraaryl diphosphines wherein at least 50% of the mixture is an ortho alkoxy substituted diphosphine that has an alkoxy substituent on at least one carbon atom ortho to the carbon atom through which each aryl group is connected to phosphorus, and the remainder of the mixture is a diphosphine that is free of ortho alkoxy substituents.

2. The composition of claim 1 wherein the ortho alkoxy substituted diphosphine is of the formula

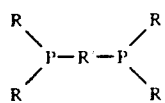

wherein R is aryl of up to 10 carbon atoms inclusive having an alkoxy substituent at least one carbon atom ortho to the carbon atom connecting each R to phosphorus, and R' is a divalent linking group of up to 10 carbon atoms inclusive and from 2 to 4 carbon atoms inclusive in the bridge.

3. The composition of claim 2 wherein the diphosphine free of ortho alkoxy substitution is represented by the formula

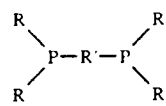

wherein R is aryl of up to 10 carbon atoms free of alkoxy substituents on carbon atoms ortho to the carbon atom connecting each R to phosphorus, and R' is a divalent linking group of up to 10 carbon atoms inclusive and from 2 to 4 carbon atoms inclusive in the bridge.

4. The composition of claim 3 wherein the palladium compound is palladium acetate.

5. The composition of claim 4 wherein the anion is an anion of trifluoroacetic acid or p-toluenesulfonic acid.

6. The composition of claim 5 wherein the ortho alkoxy substituted diphosphine is 1,3-bis[di(2-methoxyphenyl)phosphino]propane.

7. The composition of claim 6 wherein the diphosphine free of ortho alkoxy substitution is 1,3-bis[di(4-chlorophenyl)phosphino]propane.

8. The composition of claim 6 wherein the diphosphine free of ortho alkoxy substitution is 1,3-bis(diphenylphosphino)propane.

9. The composition of claim 8 wherein the anion is the anion of trifluoroacetic acid.

10. The composition of claim 1 wherein the mixture of tetraaryl diphosphines contains at least about 65% ortho alkoxy substituted diphosphine.

* * * * *